United States Patent

Weber

[15] 3,692,409

[45] Sept. 19, 1972

[54] APPARATUS FOR READING AND ELECTROPHOTOGRAPHICALLY REPRODUCING MICROPHOTOGRAPHS OF VARYING SIZES

[72] Inventor: Guy Paul Weber, Arques La Bataille, France

[73] Assignee: La Cellophone, Paris, France

[22] Filed: Feb. 9, 1971

[21] Appl. No.: 113,868

[52] U.S. Cl. ....................355/45, 352/198, 352/203, 353/26, 353/39, 355/67

[51] Int. Cl. ..............................................G03b 27/54

[58] Field of Search................355/44, 45, 66, 67, 71; 352/198, 203; 353/25–27, 39, 75, 85, 97

[56] References Cited

UNITED STATES PATENTS

| | | | |
|---|---|---|---|
| 3,002,434 | 10/1961 | Reuter, Jr. | 355/45 X |
| 3,526,456 | 9/1970 | Sage et al. | 355/45 X |
| 2,435,299 | 2/1948 | Weiskopf | 353/39 |
| 3,526,458 | 9/1970 | Meyers et al. | 355/45 |

*Primary Examiner*—John M. Horan
*Assistant Examiner*—Richard A. Wintercorn
*Attorney*—Sherman and Shalloway

[57] ABSTRACT

Apparatus for reading and reproducing microphotographs of varying sizes including a source of light and a condenser assembly both adjustable in accordance with the size of microphotographs to be projected, a shutter mirror for selectively supplying light from the microphotograph to a viewing screen or an exposure plane, and a cam controlled electrophotographic reproduction system for automatically producing uniform copies of microphotographs of varying sizes.

7 Claims, 4 Drawing Figures

INVENTOR,
GUY PAUL WEBER
BY Sherman & Shalloway
ATTORNEYS

PATENTED SEP 19 1972

3,692,409

SHEET 2 OF 2

INVENTOR,
GUY PAUL WEBER
BY Sherman & Shalloway
ATTORNEYS

APPARATUS FOR READING AND ELECTROPHOTOGRAPHICALLY REPRODUCING MICROPHOTOGRAPHS OF VARYING SIZES

BACKGROUND OF THE INVENTION

1. Field of the Invention

The present invention pertains to apparatus for reading and reproducing microphotographs and, more particularly, to such apparatus for projecting and electrophotographically reproducing microphotographs of varying sizes.

2. Discussion of the Prior Art

Recently it has become extremely desirable to record files or other documents in reduced size on film, which film is commonly referred to as a microfilm or microfiche and is hereinafter referred to generically as a microphotograph. Such reduced recording permits a great volume of material to be stored in an extremely small space; however, such recording also requires suitable means for enlarging the microphotograph sufficiently for reading purposes and providing enlarged reproductions of the microphotographs.

In the past, apparatus for reading and reproducing microphotographs have been overly complex and have not adequately permitted the reading and reproduction of microphotographs of varying sizes with relatively simple apparatus not requiring a great number of adjustments. The problems involved in properly projecting microphotographs of varying sizes for either reading or reproduction are not as simple as it might appear in that variations in the projected light obtained by movement or changing of a projections lens alters the light flux existing at reading and exposure planes.

SUMMARY OF THE INVENTION

Accordingly, it is an object of the present invention to provide relatively simple apparatus for reading and electrophotographically reproducing microphotographs of varying sizes with a limited number of adjustments.

The present invention is generally characterized in apparatus for reading and reproducing microphotographs of varying sizes including a source of light, a microphotograph mounted to receive light from the source, a projection system for selectively providing light from the microphotograph to a viewing screen or an exposure zone, a reproduction system disposed in the exposure zone to electrophotographically reproduce a copy of the microphotograph and a condenser assembly for concentrating light from the source on the microphotograph including a pair of spaced stationary lenses and a plurality of movable lenses individually positionable between the stationary lenses to concentrate light on microphotographs of different sizes.

Another object of the present invention is to utilize a plurality of lenses to properly concentrate light for microphotographs of varying sizes.

A further object of the present invention is to utilize a variable electronic control to adjust light intensity in apparatus for reading and electrophotographically reproducing microphotographs of varying sizes.

Another object of the present invention is to utilize a motor controlled cam mechanism to provide a precise reproduction time period and control the driving, cutting, and holding of electrophotographic paper for use in making reproductions of microphotographs.

The present invention has another object in that microphotographs of varying sizes are reproduced at a standard size with a constant exposure time.

A further object of the present invention is to simplify the adjustments normally required to reproduce microphotographs of varying sizes by utilizing a suitable projection lens for each microphotograph size and a condenser lens corresponding to each microphotograph size and movable within a condenser assembly to properly concentrate light on the microphotographs.

Some of the advantages of the present invention over the prior art are that various size microphotographs may be reproduced while requiring only simple adjustments, that reproductions of a standard size may be produced from microphotographs of various sizes, and that reproductions may be produced without sensing the position of sheets of electrophotographic paper.

Other objects and advantages of the present invention will become apparent from the following description of the preferred embodiment taken in conjunction with the accompanying drawings.

DESCRIPTION OF THE PREFERRED EMBODIMENT

Figure 1:
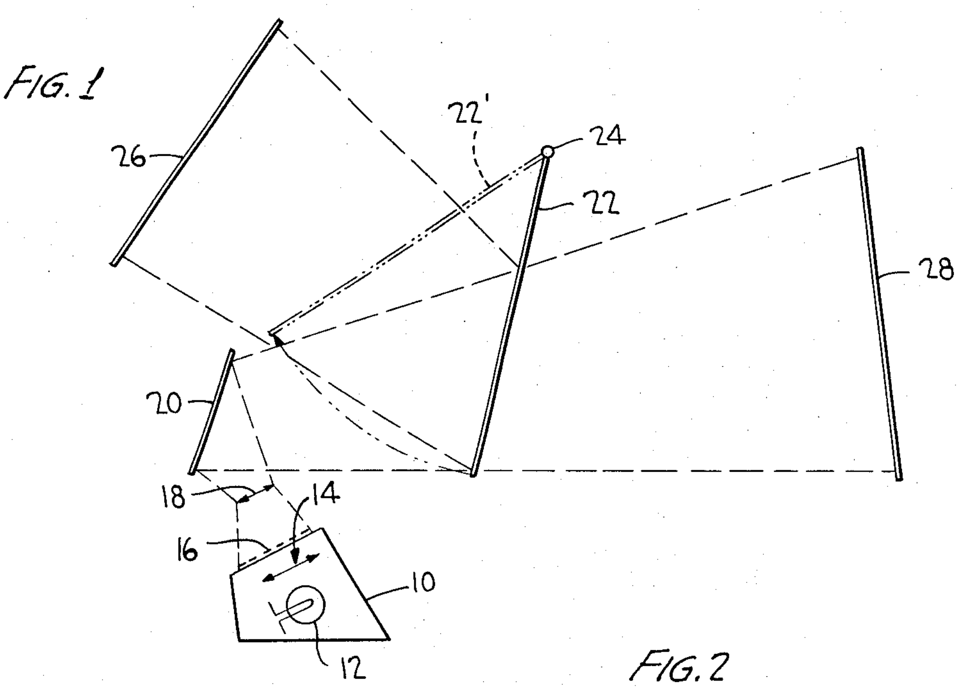
FIG. 1 is a schematic representation of an optical system for use with the apparatus of the present invention.

An optical system for use with the apparatus of the present invention is illustrated in FIG. 1 and includes a light projecting unit 10 having a light source 12 and a condenser assembly 14 mounted therein. The condenser assembly concentrates light on a microphotograph original 16 which is suitably held on projection unit 10, and a projection lens 18 is positioned between original 16 and a reflection mirror 20. A shutter mirror 22 is pivotally mounted at 24 such that light from projection unit 10 passes through original 16 and projection lens 18 and is reflected by mirrors 20 and 22 to a translucent reading or viewing screen 26. When shutter mirror 22 is pivoted to position 22', as shown in dotted lines, light reflected from mirror 20 is directed to an exposure plane or zone 28.

Figure 2:
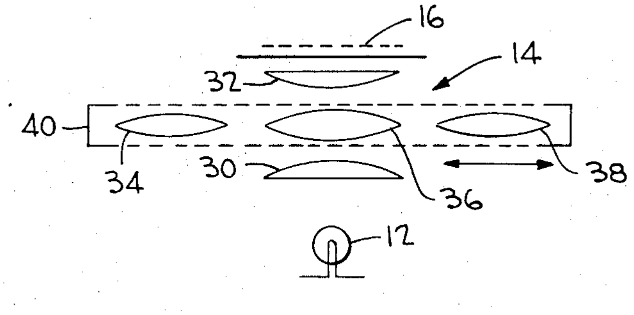
FIG. 2 is a schematic representation of a condenser assembly for use with the optical system of FIG. 1.

The condenser assembly 14 is illustrated in FIG. 2 and includes a pair of stationary converging lenses 30 and 32 disposed between the light source 12, which may be for example a quartz iodine lamp, and the microphotograph original 16. Three converging lenses 34, 36 and 38 are mounted in a sliding tray 40, which tray is movable in a direction transverse to the direction of light through the condenser assembly to precisely position any selected one of the lenses 34, 36 and 38 between stationary lenses 30 and 32 and avoid any adjustment of lenses 34, 36 and 38 relative to the light path. Each of movable lenses 34, 36 and 38 is designed for use with a microphotograph original of a specific size, and a suitable projection lens 18 is utilized for microphotograph originals of various sizes. Thus, it can be seen that along with the use of a suitable projection lens to provide reading and reproduction of a predetermined size for all sizes of microphotograph originals, the condenser assembly is varied in order to position a condenser lens therein suitable for use with the size of the microphotograph original 16 to be projected such that maximum light is concentrated on the microphotograph original.

While only three condenser lenses have been illustrated in tray 40, it will be appreciated that as many lenses as are required for the various sizes of microphotograph originals to be projected may be mounted in the tray. For example, it is desirable to provide suitable lenses for use with microfiches having dimensions of 18 × 22 mm and 24 × 36 mm and 16 mm strip microfilm. Accordingly, the lenses 34, 36 and 38 are each designed for use with one of the above dimensioned microphotographs, respectively.

Figure 3:
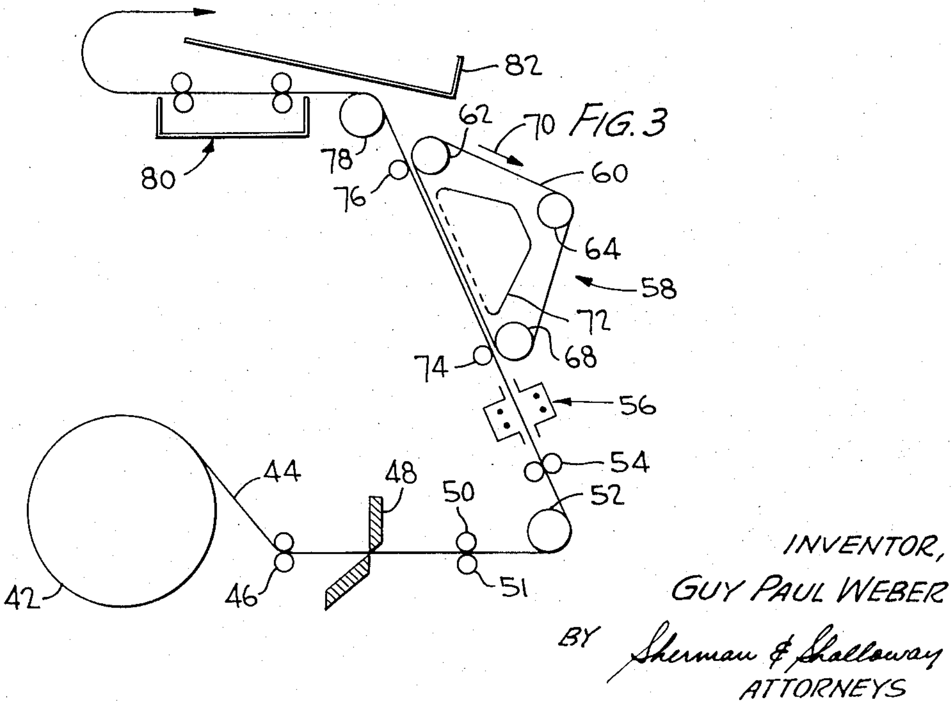
FIG. 3 is a schematic representation in side elevation of reproduction apparatus in accordance with the present invention.

An electrophotographic reproduction system for use with the present invention is illustrated in FIG. 3 and includes a roll 42 for continuously supplying electrophotographic paper 44 to a pair of driven rollers 46. From driven rollers 46 the paper 44 passes by a cutting mechanism 48 to a driven roller 50 which operates with a pressing roller 51 to supply the paper 44 around a guide 52, and a pair of rollers 54 drive the paper past a corona charging station 56 to an exposure station 58. Exposure station 58 includes a perforated belt 60 which is arranged around three rollers 62, 64 and 68 to be moved in the direction of an arrow 70 by a suitable electromagnetic clutch coupling, not shown. Within belt 60 is a box 72 which acts as a source of vacuum to support the electrophotographic paper 44 on perforated belt 60. A driven roller 74 is positioned at the entrance to exposure station 58, and a driven roller 76 is positioned at the exit of exposure station 58. The distance between rollers 74 and 76 approximates the length of electrophotographic paper utilized for each reproduction as will be explained hereinafter. From the exit of exposure station 58 the exposed electrophotographic paper is delivered past a guide 78 to a developing station 80; and, once toner is properly supplied and affixed to the electrophotographic paper at developing station 80, the paper is collected in a tray 82.

Figure 4:
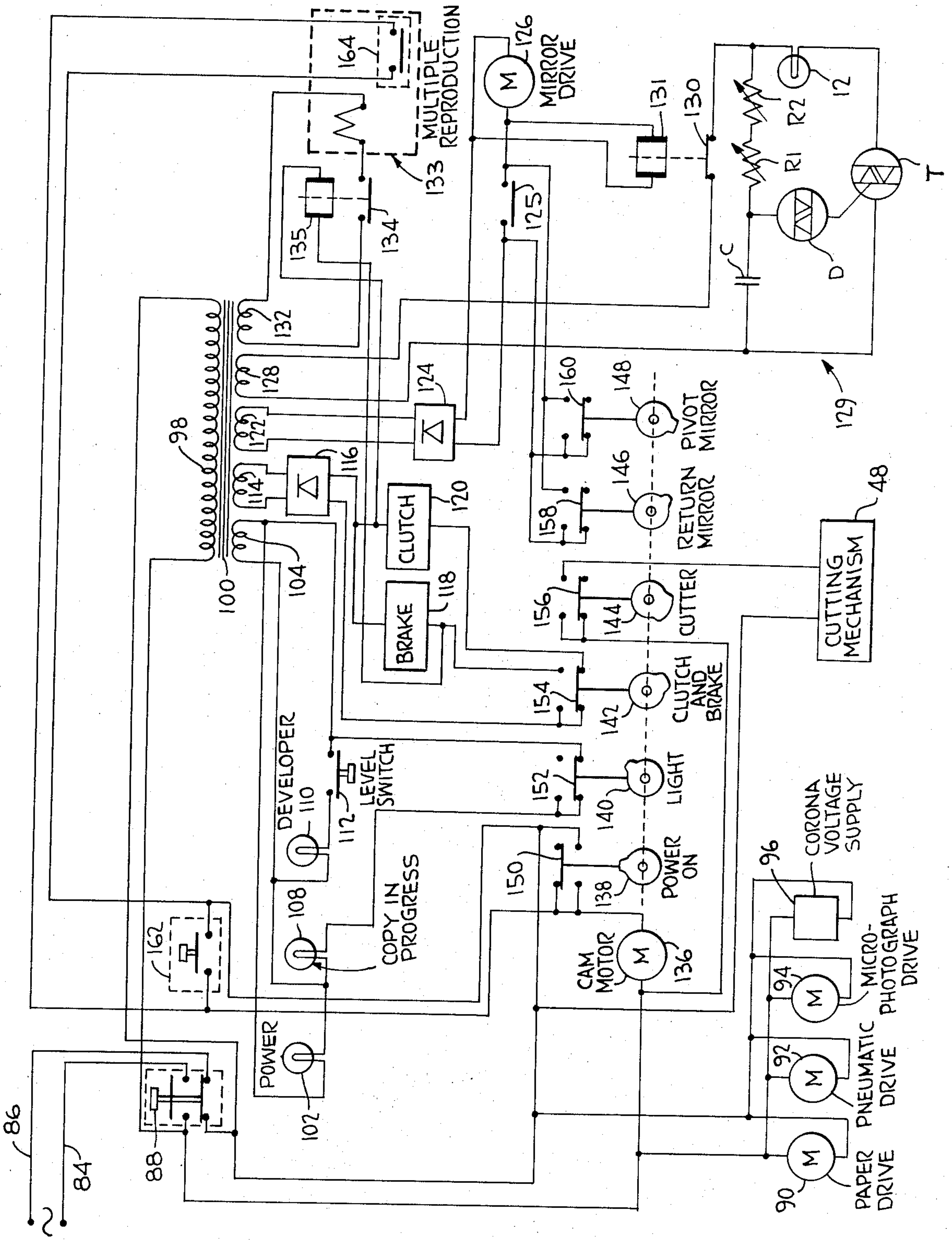
FIG. 4 is a schematic diagram of a control system for the apparatus of the present invention.

A control system for use with the apparatus of the present invention is illustrated in FIG. 4 and includes a pair of leads 84 and 86 for delivering power from an AC source to a power control switch 88. When switch 88 is closed, power from leads 84 and 86 is supplied to a motor 90 for driving the driven rollers and associated belts to supply the electrophotographic paper 44, a motor 92 for energizing a pump to control the pneumatic subsystem and to provide vacuum to box 72, a motor 94 for driving the microphotograph supply, and a corona voltage supply 96 for supplying appropriate voltage to the corona chargers at charging station 56.

A primary winding 98 of a transformer 100 is also energized when power control switch 88 is closed, and a lamp 102 is energized from secondary winding 104 indicating that power is being supplied to the apparatus. Secondary winding 104 also supplies electricity to a lamp 108 which, when energized, indicates that a copy is in progress and to a lamp 110 which, when energized, indicates that the supply of toner at developing station 80 is below a predetermined level as detected by the closure of a level switch 112. A secondary winding 114 is operative to supply electricity through a full-wave rectifier 116 to a brake 118 and a clutch 120, and a secondary winding 122 is operative to supply electricity through a full-wave rectifier 124 and a microswitch 125 to a motor 126 for pivoting shutter mirror 22. A secondary winding 128 supplied alternating current to a light control circuit 129 under the control of a switch 130 of a relay 131 connected in parallel with motor 126, and a secondary winding 132 supplies electricity to a multiple reproduction device 133 under the control of a switch 134 of a relay 135 connected in parallel with brake 118.

A cam controller motor 136 drives a camshaft, not shown, to control a plurality of cams 138, 140, 142, 144, 146, and 148, which cams control cam followers 150, 152, 154, 156, 158 and 160, respectively. The operation of the cam followers in controlling the sequential operation of the apparatus of the present invention will be described more specifically hereinafter. The operation of controller 136 is initially controlled by a start switch 162 which is connected in shunt with a switch 164 in multiple reproduction device 133 such that the controller may be energized by closure of start switch 162 or thereafter by closure of switch 164 in multiple reproduction device 133.

In operation, power control switch 88 is depressed to energize motors 90, 92 and 94 and the primary winding 98 of transformer 100 and to supply voltage to corona charging station 56. Once switch 88 is depressed microphotographs are moved past light projecting unit 10 by motor 94 in any conventional manner, and with mirror 22 in the light path the microphotographs may be viewed on screen 26. If it is desired to reproduce a selected one of the microphotographs, start button 162 is depressed to energize motor 136 to begin sequential operation of the reproduction process. Cam 138 is operative, once motor 136 is energized, to complete a circuit through motor 136 regardless of whether switches 162 and 164 remain depressed, thereby assuring that controller 136 will be operated for a complete cycle. Cam 140 is operative to energize lamp 108 to indicate that a reproduction is in progress.

Clutch 120 is energized at the beginning of the cycle due to the position of cam 142 to supply paper 44 from roll 42 past cutting mechanism 48. The speed at which the drive rollers operate is related to the rotation of the cam shaft of controller 136 such that, once a predetermined length of paper 44 corresponding to the distance between rollers 74 and 76 is moved past cutting mechanism 48, the cutting mechanism is energized by movement of cam follower 156 to cut the paper to the predetermined length. When the paper is cut, drive rollers 46 are deenergized; and, thereafter, drive rollers 50, 54, 74 and 76 move the sheet of paper 44 to exposure station 58 after charging at station 56. Due to the relation between the distance between cutting mechanism 48 and exposure station 58 and the movement of cam 142, the sheet of paper 44 is precisely positioned at exposure station 58 when brake 118 is energized and clutch 120 is deenergized by movement of cam follower 154.

Motor 126 is controlled by cams 146 and 148 in order to provide sequential positioning of shutter mirror 22 during reproduction. Cam follower 160 energizes motor 126 in response to movement of cam 148 to move the shutter mirror to position 22' out of the path of light to the exposure zone 28 just before cam follower 154 energizes brake 118 to stop the cut sheet of electrophotographic paper at the exposure zone by deenergizing rollers 74 and 76. Light control circuit 129 is deenergized when motor 126 is energized in response to movement of cam 148 due to the opening of switch 130 under the control of relay 131 in order to prevent distortion of light directed to the electrophotographic paper at the exposure zone 28.

Once cam follower 160 returns to its normal position illustrated in FIG. 4, electricity is supplied to light control circuit 129 to energize lamp 12 and permit light to be projected to exposure zone 28 to selectively discharge the electrophotographic paper thereat. The electrophotographic paper is held stationary at the exposure zone for a constant period of time as controlled by cam 142 to provide a sufficient time to discharge the electrophotographic paper and provide a latent charge image thereon. Once this period of time has elapsed, the shutter mirror is returned to the reading position in the path of light in response to movement of cam 146 and clutch 120 is energized in response to cam 142 to energize rollers 74 and 76 and perforated belt 60 to move the sheet of electrophotographic paper to developing station 80 for application of toner thereto. Of course, light control circuit 129 is deenergized when motor 126 returns mirror 22 to the reading position.

The cutting mechanism 48 is raised during this period to permit further supply of electrophotographic paper 44 for the provision of sequential copying if multiple reproduction device 133 has been actuated to provide a plurality of reproductions. As is conventional, once the required number of reproductions has been produced, switch 164 in device 133 will be opened to return the system to its ready status, requiring depression of start button 162 to initiate a succeeding reproduction.

The operation of light control circuit 129 is dependent upon the adjustment of a timing circuit including a capacitor C and variable resistors R1 and R2 connected in series across secondary winding 128 which acts as a source of electricity. Lamp 12, which represents the source of light in projection unit 10, is connected in series with inverse-parallel controlled rectifiers such as a triac T across secondary winding 128, and inverse-parallel breakdown diodes in the form of a diac D are connected between the junction of capacitor C and resistor R1 and the gate electrode of triac T.

With switch 130 closed, capacitor C will charge in accordance with the time constant set by resistors R1 and R2 such that diac D will be triggered at a predetermined phase angle of each positive and negative cycle of electricity supplied by secondary winding 128. Accordingly, the intensity of lamp 12 is controlled by the varying of resistors R1 and R2, and it will be appreciated that while resistors R1 and R2 are schematically illustrated as being linearly adjustable, suitable means may be utilized to preset the total resistance of resistors R1 and R2 in accordance with the size of the microphotograph original 16 and the condenser lens in holder 40 to be positioned between lenses 30 and 32. That is, the light control circuit may be simply adjusted along with the adjustment of the condenser assembly to control the light intensity concentrated on the microphotograph 16. By controlling the light intensity of source 12, reproductions of microphotographs of varying sizes may be obtained in a standard period of time while obtaining uniform reproductions without modifying the optical field as with a conventional diaphragm. Of course, other light control circuits may be utilized in accordance with the present invention. However, the specific light control circuit 129 is advantageous due to the use of solid state components providing precise phase angle firing of lamp 12.

It will be appreciated that the present invention is highly advantageous over conventional microphotograph reading and reproducing apparatus in that microphotographs of varying sizes may be read and uniformly reproduced with precision while requiring only simple adjustments due to the concentrating of light on the microphotograph original by adjustment of the condenser assembly and the control of the light intensity of source 12 in the projection unit 10 by adjustment of light control circuit 129. Furthermore, the reproduction system of the present invention has the distinct advantage of being operated on a time basis rather than by requiring mechanical feeler switches to sequentially control the reproduction process. That is, due to the relationship of the movement of the cams controlled by cam motor 136 with respect to the speed and distance of movement of the electrophotographic paper 44, the reproduction process may be controlled without requiring the sensing of the position of the paper which, accordingly, greatly reduces normal causes of system maladjustment and deterioration of the photoconductive layer of the electrophotographic paper. By utilizing a vacuum source to hold the electrophotographic paper on perforated belt 60 at exposure zone 28, the necessity of providing a glass at the exposure zone is obviated which, accordingly, eliminates any danger of distortion of the projected light and any further deterioration of the photoconductive layer of the electrophotographic paper.

The control system illustrated in FIG. 4 is meant to be illustrative only, and it will be appreciated that the time control provided by the cam controller could be accomplished by various other mechanical and electronic systems. Of course, it is of primary importance that such control systems provide precise timing to obviate the requirement of sensing the position of the electrophotographic paper upon which a copy is to be produced.

Inasmuch as the present invention is subject to many variations, modifications, and changes in detail, it is intended that all matter described above or shown in the accompanying drawings be interpreted as illustrative and not in a limiting sense.

What is claimed is:

1. Apparatus for reading and reproducing microphotographs of varying sizes comprising a source of light including a source of electricity, lamp means, controlled rectifier means connected in series with said source of electricity and said lamp means, and adjustable means connected with said controlled rectifier means and said source of electricity to control the operation of said controlled rectifier means whereby light intensity from said lamp means may be controlled in accordance with the size of a microphotograph to be reproduced;

mounting means for holding a microphotograph to receive light from said source;

a projection system for selectively projecting light from the microphotograph to a viewing screen or an exposure zone;

electrophotographic reproducing means disposed at said exposure zone to electrophotographically produce a copy of the microphotograph; and a condenser assembly for concentrating light from said source on the microphotograph.

2. The apparatus as recited in claim 1 wherein said condenser assembly includes a pair of spaced stationary lenses and a plurality of movable lenses supported in a holder to be individually positioned between said stationary lenses, each of said movable lenses being operative to concentrate light on microphotographs of different sizes.

3. The apparatus as recited in claim 1 wherein said controlled rectifier means includes a triac having a gate electrode and said timing means includes capacitor means connected in series with adjustable resistor means and a diac connected in series between said gate electrode and the junction between said capacitor means and said resistor means.

4. The apparatus as recited in claim 1 wherein said electrophotographic reproducing means includes means for supplying electrophotographic paper, cutting means for cutting said electrophotographic paper to predetermined lengths, means for charging the paper, means for holding the charged paper in a position to be exposed to light from said projection system to selectively discharge said charged paper to form a latent image thereon, means for developing said latent image by applying toner thereto, and time control means connected to control said paper supply means, said cutting means, said charging means, said holding means and said developing means to operate for a constant time period regardless of the size of the microphotograph to be reproduced.

5. The apparatus as recited in claim 4 wherein said projection system includes a shutter mirror pivotable between a first position reflecting light to said viewing screen and a second position out of the light path to provide light at the exposure zone, said shutter mirror being controlled by said time control means.

6. Apparatus for reproducing microphotographs of varying sizes comprising a source of light;

mounting means for holding a microphotograph to receive light from said source;

a condenser assembly for concentrating light from said source on the microphotograph and including a plurality of lenses each being operative to concentrate light on a microphotograph of a different size;

a projection system for projecting light from the microphotograph to an exposure zone to expose an electrophotographic element and including an objective selected in accordance with the size of the microphotograph to be reproduced; and electrophotographic reproducing means disposed at said exposure zone to electrophotographically produce a copy of the microphotograph including time control means for exposing the electrophotographic element to light from said projection system for a constant period of time regardless of the size of the microphotograph to be reproduced whereby microphotographs of differing sizes may be reproduced with a constant exposure time by utilizing a predetermined objective and condenser lens.

7. The apparatus as recited in claim 5 wherein said electrophotographic reproducing means includes means for supplying electrophotographic paper, means for cutting said electrophotographic paper to predetermined lengths, means for charging the paper, means for holding the charged paper in a position at said exposure zone to be exposed to light from said projection system to selectively discharge said charged paper to form a latent image thereon, and means for developing said latent image by applying toner thereto, said time control means being connected to control said paper supply means, said cutting means, said charging means, said holding means and said developing means to operate for a constant time period regardless of the size of the microphotograph to be reproduced.

* * * * *